United States Patent [19]  [11] 4,373,085
Bolze et al.  [45] Feb. 8, 1983

[54] POLYESTERAMIDE ADHESIVES

[75] Inventors: Manfred Bolze, Bergkamen-Oberaden; Manfred Drawert, Froendenberg, both of Fed. Rep. of Germany

[73] Assignee: Schering Aktiengesellschaft, Berlin and Bergkamen, Fed. Rep. of Germany

[21] Appl. No.: 295,660

[22] Filed: Aug. 24, 1981

[30] Foreign Application Priority Data

Sep. 3, 1980 [DE] Fed. Rep. of Germany ....... 3033132

[51] Int. Cl.$^3$ .............................................. C08G 69/44
[52] U.S. Cl. ................................. 528/291; 156/330.9; 156/331.8; 156/332; 427/208.2
[58] Field of Search .......................... 260/1.8 N, 22 D; 528/291; 156/330.9, 331.8, 332; 427/208.2

[56] References Cited

U.S. PATENT DOCUMENTS 2,653,880  9/1953  Hendricks .......................... 117/68.5
3,397,816  8/1968  Ess et al. ................................ 220/81
3,582,507  6/1971  Peerman ............................... 260/23
4,045,389  8/1977  Drawert et al. .................. 260/18 N
4,150,002  4/1979  Drawert et al. ................... 260/18 N

FOREIGN PATENT DOCUMENTS 1520002  7/1975  Fed. Rep. of Germany.
1055610  1/1967  United Kingdom.
1055676  1/1967  United Kingdom.
1076030  7/1967  United Kingdom.
1138142  12/1968  United Kingdom.
1226122  3/1971  United Kingdom.
1227858  4/1971  United Kingdom.

Primary Examiner—Ronald W. Griffin
Attorney, Agent, or Firm—Curtis, Morris & Safford

[57] ABSTRACT

What are disclosed are a polyesteramide prepared by the condensation of
(A) a dimerized fatty acid having 16–44 carbon atoms,
(B) a diamine of the formula

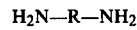
$H_2N-R-NH_2$ wherein R is aliphatic hydrocarbon having 2–36 carbon atoms,
(C) diglycolamine ($H_2N-CH_2CH_2-CH_2-CH_2-OH$), and, optionally,
(D) at least one dicarboxylic acid of the formula

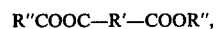
$R''COOC-R'-COOR''$, wherein R' is an aliphatic, cycloaliphatic, aromatic, or araliphatic hydrocarbon having 4 to 12 carbon atoms and R'' is hydrogen or alkyl having 1 to 8 carbon atoms, and the use of such a polyesteramide as a melt adhesive for organic and inorganic substrates.

6 Claims, No Drawings

POLYESTERAMIDE ADHESIVES

The present invention relates to polyesteramides prepared by the condensation of dimerized fatty acids, aliphatic diamines, diglycolamine and, optionally, codicarboxylic acids, and to the use of such polyesteramides for adhering organic and inorganic substrates.

Polyesteramides prepared from dimerized fatty acids of an exactly defined composition, a dicarboxylic acid, a diamine, and alkanolamines of the general formula $H_2N\text{-}R'''\text{-}OH$, in which $R'''$ is aliphatic hydrocarbon, are known from German published patent application No. 1,520,002. These products are said to exhibit a higher resistance to peeling on metals in combination with good impact resistance.

To be sure, at room temperature these products show a very nice flexibility which, however, leaves something to be desired for certain other uses, particularly at low temperatures around or below 0° C. Further, their adhesion to organic substrates such as polyethylene, or to those metals known to be difficult to adhere to such as lead or aluminum, still does not meet the demands encountered in practice.

The object of the present invention is to overcome these disadvantages of the state of the art and to provide polyesteramides which show good adhesion to organic and inorganic substrates in combination with good expansion, rapid bonding times, and good low temperature flexibility.

This object has been achieved according to the present invention by the discovery of polyesteramides which are prepared by the condensation of (A) dimerized fatty acids having 16-44 carbon atoms,
(B) a diamine of the general formula $$H_2N\text{-}R\text{-}NH_2,$$

wherein R is aliphatic hydrocarbon having 2-36 carbon atoms, (C) diglycolamine ($H_2N\text{-}CH_2CH_2\text{-}O\text{-}CH_2\text{-}CH_2\text{-}OH$), and, optionally, (D) at least one dicarboxylic acid of the formula $$R''OOC\text{-}R'\text{-}COOR'',$$

wherein R' is an aliphatic, cycloaliphatic, aromatic, or araliphatic hydrocarbon having 4-12 carbon atoms and R'' is hydrogen or alkyl having 1 to 8 carbon atoms.

A further feature of the invention is the use of polyesteramides according to the invention for the adhesion of organic and inorganic substrates with themselves or with each other.

The dimerized fatty acids employed according to the present invention have a dimer content between 55 percent and 100 percent, preferably between 70 percent and 96 percent. The term "dimerized fatty acid" refers generally to polymerized acids which are obtained from "fatty acids". The term "fatty acid" encompasses unsaturated natural and synthetic monobasic aliphatic acids having 8-22 carbon atoms, preferably 18 carbon atoms. These fatty acids can be polymerized according to known methods (cf. German printed patent applications Ser. No. 1,443,938 and 1,443,968, and German Pat. Nos. 1,280,852 and 2,118,702).

Polymeric fatty acids typically available commercially have the following approximate composition:
monomeric acid 5-10 percent by weight
dimeric acids 55-80 percent by weight
trimeric acids 10-35 percent by weight.

The content of dimeric acids can be raised up to 100 percent by weight by generally known distillation methods.

The dimeric fatty acids employed can also be present in hydrogenated form.

If distilled dimeric fatty acids are employed, melt adhesives having an improved color number are obtained. On the other hand, the use of commercially available technical polymerized fatty acids is possible for the preparation of melt adhesives for particular purposes. If technical dimerized fatty acids are employed, it need only be mentioned that the content of trimeric fatty acid should not exceed a maximum limit. This limiting value depends on the content of dimeric and monomeric fatty acids in a given sample of the polymerized fatty acid and can be determined by an orientation test which is part of the manipulative daily routine of the average worker skilled in the art.

However, distilled dimerized fatty acid having a content of dimeric fatty acid of 70-96 percent is preferably used.

The content of monocarboxylic acids, which may optionally already be present, in the dimerized fatty acid can be increased still more by the addition of further monocarboxylic acids in order to adjust the product to a desired molecular weight. As monocarboxylic acids which can be used according to the present invention, particularly linear or branched, saturated or unsaturated monocarboxylic acids having 2-22 carbon atoms come into consideration, such as acetic acid, propionic acid, butyric acid, valerianic acid, lauric acid, palmitic acid, palmitolenic acid, and erucic acid. Preferred acids according to the invention are the $C_{18}$-monocarboxylic acids such as stearic acid, oleic acid, linoleic acid, linolenic acid, and the natural fatty acid, mixtures such as tall oil fatty acid or soya oil fatty acid.

As diamines which can be used according to the present invention, diamines of the formula $$H_2N\text{—}R\text{—}NH_2$$

come into consideration, wherein R is an aliphatic hydrocarbon having from 2 to 36, particularly from 2 to 6, carbon atoms, such as 1,2-diaminoethane, 1,6-diaminohexane, 1,9-diaminononane, 1,12-diaminododecane, 1,13-diaminotridecane, and dimeric fatty acid diamines (prepared by known methods from dimerized fatty acids).

As an alkanolamine, diglycolamine is employed according to the invention in addition to the diamine component. The ratio of amine to diglycolamine is essentially determined by the degree of flexibility desired at low temperatures, but also by the speed of bonding required and by the adhesion on the substrate being adhered to. Further, the nature and the amount of the acids employed influence the ratio.

According to the invention, an equivalent ratio of diamine:diglycolamine from 0.9:0.1 to 0.3:0.7, and particularly from 0.8:0.2 to 0.6:0.4 is preferred.

These ratios are not critical: if practical requirements demand it, they can be exceeded by a certain degree above and below the limits specified for modification of the product.

It is known of certain polyamides comprising dimeric fatty acids, alkanolamines, and co-dicarboxylic acids that the products take up atmospheric humidity in an increased measure and can undergo a degradation of viscosity (hydrolysis) on remelting. This disadvantage can, surprisingly, be overcome using the products according to the present invention comprising diglycolamine.

It was surprising that by the use of diglycolamine instead of using the known pure aliphatic alkalolamines, such a good combination of desirable properties could be attained. This particularly includes good adhesion on polyethylene, which is known to be difficult to adhere, as well as adhesion on metals, particularly lead and aluminum, which have not been prewarmed. In the latter case, it is advantageous to employ a diglycolamine content of 0.4 to 0.6 equivalent. It was also surprising that, despite the improved low temperature flexibility at −20° C., the short bonding times of the product at room temperature can be maintained. This is surprisingly true also for those products having relatively low softening points.

In addition to polyethylene, lead, and aluminum, the following substrates can be bonded to themselves or between each other: leather, rubber, textiles, wood, paper, polyvinylchloride, polyolefins, polyesters, ceramics, and the ferrous and non-ferrous metals common in technology such as steel, copper, zinc, tin, or alloys thereof.

For the polyesters which are particularly difficult to adhere, the diglycolamine portion of the polyesteramide of the present invention is advantageously raised to over 0.5 equivalent.

The dicarboxylic acids which are optionally employed according to the present invention fall within the general formula

R″OOC—R′—COOR″, in which R′ is optionally substituted aliphatic, cycloaliphatic, aromatic, or araliphatic hydrocarbon having 4–12 carbon atoms and R″ is hydrogen or alkyl having 1–8 carbon atoms.

The codicarboxylic acids are employed in amounts from 0 to 0.9 equivalent, calculated on the dimerized fatty acid. As example thereof are mentioned the following:

adipic acid, pimelic acid, sebacic acid, azelaic acid, sebacic acid, decanedicarboxylic acid, brassylic acid, 1,4-cyclohexanedicarboxylic acid, terephthalic acid, isophthalic acid, naphthalene dicarboxylic acid, and 1,4-phenylenediacetic acid. Azelaic, sebacic and terephthalic acids are preferred according to the invention.

The sum of the molar equivalents of amine groups and hydroxyl groups of components (B) and (C) which are employed is preferably substantially the same as the number of molar equivalents of carboxyl groups of components (A) and (D).

The condensation of the components described above to form the polyester amides according to the present invention takes place at temperatures between 200° C. and 300° C. in the conventional fashion.

A better understanding of the present invention will be had by referring to the following specific examples, given by way of illustration. In the examples, a testing of the bonding time takes place according to the following method, the results of which are entered in the Tables below.

A stretched piece of rubber, 3 mm thick, ("Noratest"-rubber) having an area of 6 cm$^2$ is adhered to a second rubber piece with the adhesive applied at a temperature of 200° C. The adhesive joint in this case is 70–80 microns thick. By means of a spring, a separating force of 0.067 N/mm$^2$ is applied to the adhered rubber piece at room temperature. The bonding time is defined as that time at which the separating force no longer is capable of removing the top rubber piece from the piece below it. The test on metals takes place using the same experimental arrangement. The bonding times on metals are substantially shorter than the values determined on rubber because of the better heat conductivity of the former.

This method has the advantage that the bonding time is determined on an adhesive joint conforming to what is found in practice.

The measurement of expansion is determined according to ASTM D 1708.

The evaluation of adhesion (Table 3) is done subjectively according to the following method:

The resin applied from a melt onto the substrate is permitted to cool to room temperature (about one hour) and then an attempt is made to peel off the resin from the substrate with a knife. The judgements signify:

"very good" to "good"=no peeling is possible
"satisfactory"=partial fragmentation of the resin is possible.

The dimeric fatty acids used in the following Examples have the following composition (according to gas-liquid-chromotography):

| | | |
|---|---|---|
| Ex. 1–3, 5, 10 | polymerized oleic acid: | |
| | monomeric fatty acid | 3.9 percent |
| | dimeric fatty acid | 93.1 percent |
| | trimeric and higher polymeric fatty acids | 3.0 percent |
| Ex. 6–9 | polymerized tall oil fatty acid: | |
| | monomeric fatty acid | 3.0 percent |
| | dimeric fatty acid | 93.0 percent |
| | trimeric and higher polymeric fatty acids | 4.0 percent |
| Ex. 4 | polymerized tall oil fatty acid: | |
| | monomeric fatty acid | 4.0 percent |
| | dimeric fatty acid | 77.8 percent |
| | trimeric and higher polymeric fatty acids | 18.2 percent |

EXAMPLE 1

400 g of dimerized oleic acid (1 equivalent), 38.02 g of ethylene diamine (0.9 equivalent), and 7.38 g of diglycolamine (0.1 equivalent) are mixed with each other under nitrogen in a 1-liter 3-necked flask provided with a stirrer, thermometer, and descending condenser and are heated within a period of two hours to 230° C. This temperature is maintained for six hours.

During the last four hours, a vacuum of 20 mm Hg is applied.

The polyester amide obtained has a ring and ball softening point of 108° C. and a melt viscosity, measured at 200° C., of 13.6 Pa.s.

The expansion value of the product at 0° C. is 4.8 m/m.

The products entered into the following Tables are prepared in an analogous fashion.

TABLE 1

| Example | Composition (Equivalents) | | | | Ring and Ball Softening Point (°C.) | Melt Viscosity at 200° C. (Pa.s) | Bonding Time (seconds) | Expansion (m/m) |
|---|---|---|---|---|---|---|---|---|
| | Polymeric Fatty Acid | Co-Dicarboxylic Acid | Diamine | Diglycolamine | | | | |
| 2 | 1.0 polymerized oleic acid | — | 0.7 ethylenediamine | 0.3 | 93° C. | 4.0 | 2 | 6.3 |
| 3 | 0.9 polymerized oleic acid | 0.1 azelaic acid | 0.6 ethylenediamine | 0.4 | 113° C. | 3.7 | 1.5 | 7.4 |
| 4 | 0.9 polymerized tall oil fatty acid | 0.1 azelaic acid | 0.6 ethylenediamine | 0.4 | 107° C. | 2.0 | 6 | 6.3 |
| 5 | 0.7 polymerized oleic acid | 0.3 azelaic acid | 0.6 ethylenediamine | 0.4 | 147° C. | 3.8 | 3 | 5.7 |
| 6 | 0.8 polymerized tall oil fatty acid | 0.2 dimethylterephthalate | 0.5 ethylenediamine | 0.5 | 182° C. | 0.7 | 180 | 12.0 |
| 7 | 0.7 polymerized tall oil fatty acid | 0.3 phenylene diacetic acid | 0.6 ethylenediamine | 0.4 | 195° C. | 4.6 | 2 | 3.7 |
| 8 | 0.6 polymerized tall oil fatty acid | 0.2 azelaic acid 0.2 sebacic acid | 0.5 ethylenediamine | 0.5 | 119° C. | 1.2 | 30 | 3.8 |
| 9 | 0.1 polymerized tall oil fatty acid | 0.9 azelaic acid | 0.8 dimeric diamine | 0.2 | 91° C. | 2.4 | 15 | 5.1 |
| 10 | 0.7 polymerized oleic acid | 0.3 azelaic acid | 0.6 hexamethylene diamine | 0.4 | 115° C. | 2.1 | 660 | 3.0 |

TABLE 2

| | Comparison Examples - Composition (in Equivalents) | | | | |
|---|---|---|---|---|---|
| | Polymerized Fatty Acid | Azelaic Acid | Ethylene Diamine | Diglycolamine | Ethanolamine |
| Product of Example 2 | 1.0 polymerized oleic acid | — | 0.7 | 0.3 | — |
| Comparison Product A | 1.0 polymerized oleic acid | — | 0.7 | — | 0.3 |
| Product of Example 5 | 0.7 polymerized oleic acid | 0.3 | 0.6 | 0.4 | — |
| Comparison Product B | 0.7 polymerized oleic acid | 0.3 | 0.6 | — | 0.4 |

TABLE 3

| | Comparison Examples - Properties | | | | | | | |
|---|---|---|---|---|---|---|---|---|
| | Ring and Ball Softening Point (°C.) | Melt Viscosity at 200° C. (Pa.s) | Adhesion to Polyethylene | Adhesion to Lead | Bonding Time (seconds) | Expansion (m/m) at | | |
| | | | | | | Room Temperature | 0° C. | −20° C. |
| Product of Example 2 | 93 | 4.0 | very good | very good | 2 | 8.3 | 6.3 | 3.2 |
| Comparison Product A | 106 | 4.7 | satisfactory | satisfactory | 1 | 6.4 | 5.2 | 0.7 |
| Product of Example 5 | 147 | 3.8 | very good | very good | 4 | 4.8 | 5.7 | 4.5 |
| Comparison Product B | 150 | 3.7 | satisfactory | good | 7 | 2.1 | 5.4 | 2.6 |

What is claimed is:

1. A polyesteramide prepared by the condensation of
(A) a dimerized fatty acid having 16-44 carbon atoms,
(B) a sole diamine of the formula

$H_2N-R-NH_2$ wherein R is aliphatic hydrocarbon having 2-36 carbon atoms, and
(C) diglycolamine of formula $H_2N-CH_2CH_2-O-CH_2-CH_2-OH$.

2. A polyesteramide as in claim 1 which additionally comprises
(D) at least one dicarboxylic acid of the formula

R"COOC-R'-COOR", wherein R' is an aliphatic, cycloaliphatic, aromatic, or araliphatic hydrocarbon having 4 to 12 carbon atoms and R" is hydrogen or alkyl having 1 to 8 carbon atoms.

3. A polyesteramide as in claim 1 wherein the ratio of equivalents of diamine (B) to diglycolamine (C) is between 0.9:0.1 and 0.3:0.7.

4. A polyesteramide as in claim 2 wherein the ratio of equivalents of dimerized fatty acid (A) to dicarboxylic acids (D) is greater than 0.1:0.9.

5. The method of adhering organic and inorganic substrates with themselves or to each other which comprises applying an adhesive amount of a polyesteramide as in claim 1, in the form of a melt, to at least one of the surfaces to be bonded, bringing the surfaces into contact, and cooling the resulting adhesive joint.

6. The method of adhering organic and inorganic substrates with themselves or to each other which comprises applying an adhesive amount of a polyesteramide as in claim 2, in the form of a melt, to at least one of the surfaces to be bonded, bringing the surfaces into contact, and cooling the resulting adhesive joint.

* * * * *